March 19, 1963 R. J. SCHNEEBERGER 3,082,340
RADIATION SENSITIVE DEVICE
Filed June 17, 1959 2 Sheets-Sheet 1

WITNESSES

INVENTOR
Robert J. Schneeberger
BY
ATTORNEY

United States Patent Office 3,082,340
Patented Mar. 19, 1963

3,082,340
RADIATION SENSITIVE DEVICE
Robert J. Schneeberger, Pittsburgh, Pa., assignor to Westinghouse Electric Corporation, East Pittsburgh, Pa., a corporation of Pennsylvania
Filed June 17, 1959, Ser. No. 820,910
9 Claims. (Cl. 313—65)

This invention relates to a radiation sensitive device and more particularly to an input screen for an image device.

In certain types of thermally sensitive tubes such as described in my copending application Serial No. 594,649, entitled, "Electronic Discharge Device," filed June 28, 1956, and assigned to the same assignee, an infrared radiation image is directed on to an input screen. The infrared radiations are absorbed by a layer of infrared absorbing material and the thermal image thus formed in the layer is impressed on a semiconductive layer which exhibits a variation in electrical conductivity corresponding to the thermal image impressed thereon. The conductivity image set up in the semiconductive layer is then read by means of an electron beam to produce electrical signals in a well-known manner.

The infrared absorbing layer and the semiconductive layer are very thin and it is necessary to support them by some means. In the previously mentioned copending application, a layer of cellulose nitrate was utilized. It was found that with this type of support layer the thickness of the support layer was such that the resolution and the point-source sensitivity of the tube were severely limited. This was found to be principally due to lateral heat spread in the support layer.

It is accordingly an object of this invention to provide an improved thermally sensitive screen for an infrared detection device.

It is another object to provide a thermally sensitive input screen which may be supported by the input window.

It is another object to provide a rugged input screen.

It is another object to provide a curved input screen.

Another object is to provide a thermally sensitive target having increased resolution.

An additional object is to provide an improved supporting means for a thermally sensitive layer.

A further object is to provide an improved supporting means for a thermally sensitive target having a low thermal conductivity.

An auxiliary object is to provide a method of manufacturing an improved thermally sensitive target.

A supplemental object is to provide a method of controlling the particle size of different materials to obtain a layer of low thermal conductivity.

These and other objects are effected by this invention as will be apparent from the following description taken in accordance with the accompanying drawing throughout which like reference characters indicate like parts and in which.

Figure 1:
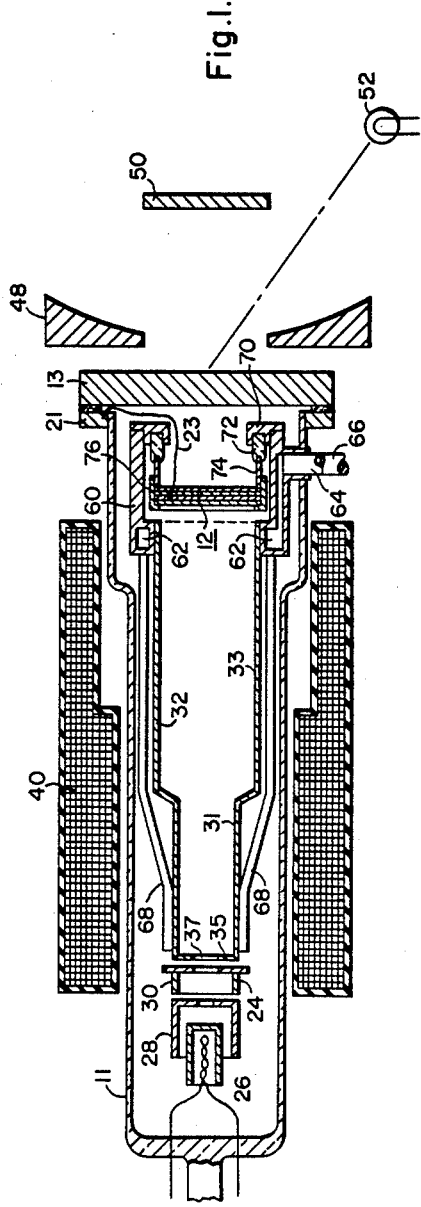
FIGURE 1 is a schematic representation of a radiation sensitive device in accordance with this invention.
Figure 2:
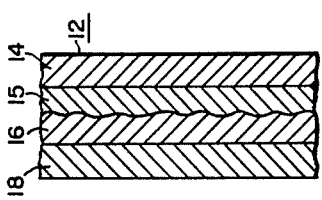
FIG. 2 is an enlarged cross sectional view of the target screen shown in FIG. 1.

Referring in detail to FIGS. 1 and 2, an evacuated vacuum tight enclosure 11 of a suitable material such as glass is utilized to enclose a thermally sensitive target structure 12 and the associated electronic beam scanning system. In this specific embodiment, radiations from a scene are projected onto the thermally sensitive target 12 and translated into a distributed charge image on the input screen or target. An electron beam is utilized to read the charge image and convert the charge image into electric signals for transmission.

The envelope 11 has an input window 13 at one end which is of a suitably wide band transmitting material such as silver chloride, barium fluoride, or calcium fluoride. The window 13 permits the transmission of both visible and infrared radiation up to at least 14 microns in wave length. The target or input screen 12, is supported by a plate or window 14 of a similar material to that used in window 13. The screen 12 consists of a thermally insulating layer 15 deposited on the inner surface of the window 14 with an infrared absorbing layer 16 deposited on the exposed surface of the layer 15. In some embodiments the support member 14 may be provided by the window 13. A layer 18 of a thermally sensitive semiconductor material is deposited on the exposed surface of the infrared absorbing layer 16 and completes the input screen 12. The layer 16 is in intimate thermal contact with the layer 18.

In the specific embodiment shown in FIGS. 1 and 2, the layers 16 and 18 are thermally insulated from the window 14 by the layer 15. The layer 15 is transmissive to both the visible and infrared radiation. An electrical lead 23 is provided from the layer 16 of the target electrode 12 to an electrically conductive ring 21 to provide an external connection. A thin layer (not shown) of electrically conductive material is provided on the support 14 to which the lead 23 is connected. The layer 16 contacts this thin layer to provide good electrical connections.

An electron gun 24 of any suitable type is provided at the opposite end of the envelope 11 to scan the exposed surface of the semiconductor layer 18. The gun 24 consists of a cathode 26, a control grid 28, an accelerating grid 30 and an anode 32. The control grid 28 may operate from zero to a negative 100 volts with respect to the cathode 28. The anode structure 32 extends from the accelerating grid 30 to the vicinity of the target 12 and controls the potential of most of the space through which the electron beam moves from the cathode 26 to the target 12. The anode 32 is operated at a positive potential of slightly less than 300 volts with respect to the cathode 26.

In the specific device shown, the anode 32 is composed of two tubular sections 31 and 33. The section 33 is the end portion of the anode 32 and is of a good heat conductive material such as copper. The remaining section 31 of the anode 32 is of a material such as Nichrome. It is necessary that the section 31 be of a non-magnetic material such as Nichrome in order not to interfere with the magnetic field used. A diaphragm 35 is provided in the section 31 near the end adjacent the cathode 26. The diaphragm has a centrally located aperture 37 provided therein. This diaphragm provides means of shielding radiation generated at the cathode from the target 12.

In the specific embodiment shown, an extension member 60 of a material such as copper, is provided on the tubular portion 33 of the anode 32. The primary purpose of the extension member 60 is to provide cooling for the target 12. The cooling extension member 60 is provided with cavity 62 in which a cooling medium is circulated. Two tubular members 64 and 66 are connected to the cavity 62 to provide an inlet and outlet for the cooling medium. The inner surface of the cooling member 60 and the anode 32 may be coated with a good heat absorbing material such as gold black to reduce reflections.

Heat conduction elements 68, extending from the extension 60 to the portions of section 31 adjacent the diaphragm 35, may be provided as shown in FIG. 1. This insures cooling of the diaphragm 35, which is heated by radiation from the cathode 26. The cooling elements 68 can be attached with electrically insulating materials to not interfere with the focus and sweep fields. The elements 68 can also be positioned to minimize sweep distortion.

The target 12 is positioned within the extension 60 and near the open end of the section 33. The target is electrically insulated from the anode 32 and extension 60. This may be accomplished as shown by providing an annular copper member 70 attached to the member 60 with an annular glass member 72 attached at one edge to the member 70. The other edge of the glass member 72 is attached to a ring 74 of a suitable alloy of nickel, cobalt and iron such as that known under the trade name Kovar. The target 12 may be secured against the ring 74 by a steel ring 76. The glass member 72 provides the necessary electrical insulation.

A grid member 34 of an electrical conductive material and of the order of 500 mesh per inch is positioned adjacent the target 12 between the target 12 and the cathode 26 of the electron gun 24. The grid 34 is at the potential of the anode 32 and provides a more uniform deceleration field for the electrons.

Positioned on the exterior portion of the envelope 11, there are provided an alignment coil, a focussing coil and also a horizontal and vertical deflection coils all illustrated as 40, for focussing and deflecting the electron beam in a predetermined raster over the surface of the target 12. The potential applied to the target electrode 12 may be approximately 30 volts positive with respect to the cathode 26.

Positioned exterior to the envelope 11 and in front of the input window 13 is a suitable optical system represented by the mirrors 48 and 50 for focussing the infrared radiations from a scene onto the target electrode 12. An auxiliary light source 52 of selected wave length in the range of ultraviolet or visible light depending on the material of the thermally sensitive layer 18 may be provided in front of the input window 14 for illuminating the target electrode 12. A more complete description of the tube and operation is found in the previously mentioned copending application.

In the preparation of a target screen 12 shown in FIGS. 1 and 2, a material such as antimony tri-sulfide is evaporated in an inert gaseous atmosphere onto the infrared transmissive window support 14. It is necessary that this material such as antimony trisulfide, arsenic trisulfide or barium fluoride be evaporated in an inert gaseous atmosphere to obtain a porous, smoke-like, low density layer. The layer 15 is evaporated until a thickness of from 15 to 20 microns is obtained. It is desired that the density of the material in this layer be approximately 1% of the density of the material in its bulk state. A specific method of obtaining the layer 15, as described above is to evaporate antimony trisulfide from a crucible positioned three inches from the window at a pressure of 0.2 mm. of mercury in a nitrogen atmosphere. It has been observed by viewing this layer through an optical microscope and an electron microscope that clusters or aggregates of particles are formed. The particles are believed to consist of small crystals. The diameter of the cluster ranges up to 10 microns. The diameter of the particles range from 100 to 300 angstroms. The smaller the size of the crystals and particles the lower will be the thermal conductivity. The layer as a whole is polycrystalline.

It has been found that insulating and semi-conductive materials when evaporated in a gaseous inert atmosphere form a layer which has a low thermal conductivity. This low thermal conductivity is due in part to the low density of the material. The thermal conductivity decreases with a decrease in density.

Figure 5:
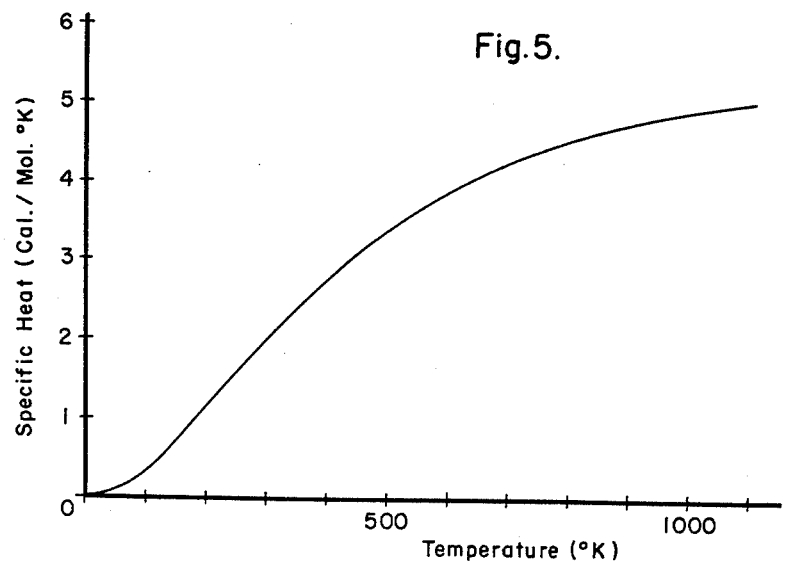
FIG. 5 is a curve showing the relation of specific heat to absolute temperature.

The thermal conductivity of a material in which heat transfer is due primarily to the mechanism of lattice vibrations may be represented by the expression $$\tfrac{1}{3} C_V v l$$

where $C_V$ is the specific heat, $l$ is the phonon mean free path and $v$ is the velocity of sound. As shown in FIG. 5, the specific heat varies as a function of the temperature of the material. At very low temperatures the specific heat approaches zero. The velocity of sound is a constant. Therefore, at low temperatures the thermal conductivity of any material is dependent upon the specific heat and the phonon mean free path. The phonon mean free path may be made small by limiting the size of the particles in the mass of which the thermal conductivity is to be determined.

Figure 4:
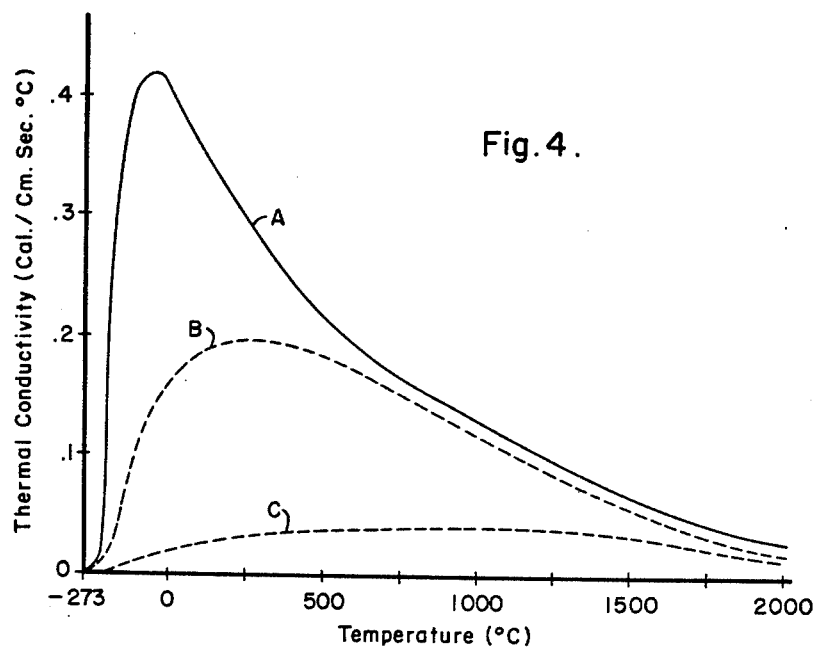
FIG. 4 shows a series of curves giving the relation of thermal conductivity to temperature as a function of the size of particles in a material.

In FIG. 4, curve A illustrates thermal conductivity of particles of a first size with temperature. Curve B represents thermal conductivity of a smaller particle size than curve A and curve C is thermal conductivity but particles of a smaller size than curve B. This illustrates that as the particle size is decreased, the thermal conductivity of the material is also decreased.

It has been found that a material which has a very low thermal conductivity due to its low density and small particle size produces means of substantially thermally isolating an infrared sensitive layer. The only other necessary requirement for this non-metallic material in layer 15 is that it be transmissive to infrared radiation in the particular portion of the infrared spectrum which is to be detected.

The layer 15 is made up of clusters of particles. This provides a somewhat rough surface and it was found difficult to obtain a surface smooth enough onto which to evaporate the infrared absorbing layer 16. The surface of the layer 15 should not be too rough. By this it is meant that it is necessary to have electrical continuity with a minimum amount of thickness in layer 16. It is also desired that the infrared absorbing layer 16 which is a smoke-like deposit of gold or platinum, does not penetrate the rough surface of the layer 15. If the material of layer 16 penetrates the body of the layer 15, the infrared absorbing material will increase the thermal conductivity of the layer 15 and destroy its property of thermal insulation. This would permit the layer 15 to conduct heat back to the window 14 from layer 16 and decrease necessary properties in the target for good image reproduction.

It is found that by evaporating a layer of gold black onto the layer 15 at a higher pressure than that to which the insulating layer 15 was evaporated, a layer of gold black is obtained comprised of larger clusters than in the layer 16. The resulting gold black layer 16 rests on the surface of the layer 15 without appreciable penetration into the body of layer 15. Cluster size of the gold black layer 16 should be about three times larger than that of the cluster size of the supporting layer 15. The thickness of the gold black layer is determined by measuring the electrical conductivity across the layer and the resistivity should be approximately 1000 ohms per square. It has been found that a thickness of approximately 4 microns results in a layer having sufficient electrical conductivity.

The pressure, spacing of crucible from surface, and rate of evaporation affect the type of layer deposited for layers 15 and 16. By varying the above critical features, a layer is obtained with a minimum amount of density about one percent of the bulk density and optimum smoothness. The cluster size is determined by the average number of collisions of the molecules of the evaporated substance from the crucible to the surface with the gas molecules and other molecules of the evaporated substance.

It is next desired that a semiconducting layer 18 be evaporated onto the infrared absorbing layer 16 so that layer 18 is in intimate thermal and electrical contact with the infrared absorbing layer 16. This is accomplished by evaporating under the same condition as that for the insulating support layer 15 and evaporating layer 18 onto the gold black layer 16. The cluster size of the semiconductor layer 18 will be about the same as the size of the clusters comprising layer 15 and therefore will fill the valleys in the gold black layer 16 and will result in an intimate bond between layers 16 and 18. It is desired that these layers be in close contact since the thermal radiation which is converted into a heat pattern in the gold black layer 16 is transmitted to the semiconductive layer 18 by conduction to obtain a device of high resolution.

It can be seen in FIG. 1 that the structure described herein also provides a means by which the infrared detection target member 12 may be disposed directly upon the infrared window 13. The device described in FIG. 1 allows cooling of the target. The materials from which infrared windows are made are fairly good thermal conductors and the structure described provides means of supporting the semiconductive layer 18 on the window and thermally insulating the layer 18 from the window.

Figure 3:
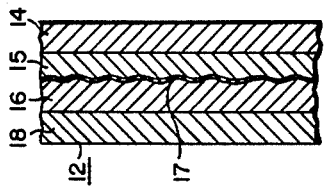
FIG. 3 is a cross sectional view of a modified target screen embodying the principles of this invention.

FIG. 3 shows another embodiment of this invention wherein the infrared absorbing layer 16 is prevented from coming into contact with the insulating layer 15 by a thin layer 17 of a cellulose material such as cellulose nitrate which may later be removed by baking in air or oxygen. It has been found that, although images are produced by having the infrared absorbing layer 16 and the insulating layer 15 in intimate contact, the resolution of the device is greatly increased by preventing the gold black layer 16 which comprises the infrared absorbing material from diffusing or penetrating into the insulating layer 15. It is necessary that these layers 15 and 16 be separated by either of the methods shown in FIGS. 2 or 3 to obtain good reproduction in the image. It has been found that by depositing the target member by the method described, a superior infrared detection device is obtained. The lateral heat spread due to insulating layer 15 is negligible. The lateral heat spread of the structure was determined primarily by the layer 16. The resolution as determined by gold black layer 16 would then be of the order of the Rayleigh limit for 10 micron radiation and a $f\,1.5$ optical system. Further advantage of this device is that the method is much simpler than the methods known previously for providing targets of this particular type.

The input screen may be supported on the input window. This allows the input screen to be supported on a curved screen surface. The curved surface may be made to coincide with the focal plane of the optical system.

While the present invention has been shown in several forms, it will be obvious to those skilled in the art that it is not so limited, but is susceptible of various changes and modifications without departing from the spirit and scope thereof.

I claim as my invention:

1. In an infrared imaging device, a target member comprising a smoke-like, porous thermally insulating layer, said layer having a density of about one percent of its normal bulk density, said layer having a thickness of about fifteen to twenty microns, an electrically continuous, smoke-like infrared absorbing layer disposed adjacent to said insulating layer and having a particle size about three times larger than the particle size of said insulating layer, said absorbing layer having a thickness of about four microns, and a smoke-like semiconducting layer in intimate contact with said absorbing layer, said semiconducting layer exhibiting the property of variation in electrical conductivity upon thermal excitation.

2. In an infrared imaging device having a vacuum envelope including an infrared transmissive portion, a target member disposed on said infrared transmissive portion comprising an insulating means having a low density compared to bulk density and of a material which is transmissive to infrared radiation and of a low thermal conductivity, an infrared absorbing means disposed adjacent said insulating means, and a semiconducting means which exhibits the property of variation in electrical conductivity upon thermal excitation disposed adjacent said absorbing means.

3. In an infrared pickup device, a target member comprising an infrared transmissive substrate, a thermally insulating layer disposed on said substrate, an infrared absorbing layer adjacent to the surface of said insulating layer remote from said substrate, and a semiconductor layer in intimate contact with said infrared absorbing layer, said semiconducting layer being of a material that exhibits the property of variation of electrical conductivity in response to thermal excitation.

4. In an infrared imaging device, a target member comprising a smoke-like, porous thermally insulating layer, said insulating layer being of a material having the properties of low density in comparison with its bulk density, low thermal conductivity and infrared transmissivity, a layer of an infrared absorbing material disposed on said insulating material so as not to penetrate into said insulating material, and a thin layer of a semiconducting material in intimate contact with said absorbing layer which exhibits a change in electrical conductivity in response to thermal excitation.

5. In an infrared imaging device having an envelope including an infrared transmissive portion, a target structure disposed on said infrared transmissive portion comprising, a thermally insulating porous, infrared transmissive layer of a non-metallic material, said insulating layer exhibiting the property of low thermal conductivity due to the small size of the particles of said layer, a porous, electrically continuous infrared absorbing layer disposed on said insulating layer and having a particle size greater than the particle size of said insulating layer so that a distinct boundary is maintained between said absorbing layer and said insulating layer thereby preventing an increase in the thermal conductivity of said insulating layer due to the penetration of particles of said absorbing layer into said insulating layer, and a porous electrically continuous semiconductor layer in intimate contact with said absorbing layer so that the thermal image produced in said absorbing layer produces a corresponding thermal image in said semiconductor layer and a corresponding variation in the electrical conductivity of elemental areas of said semi-conductor layer.

6. In a thermal imaging device, a target structure comprising a low density, smoke-like insulating layer, a smoke-like semiconductor layer exhibiting the property of variation of electrical conductivity upon thermal excitation, a smoke-like infrared absorbing layer sandwiched between said insulating layer and said semiconductor layer and in intimate contact with said semiconductor layer and means for preventing particles of said absorbing layer from diffusing into said insulating layer.

7. In an infrared imaging device, a target member comprising a first smoke-like thermally insulating layer having a first particle size, a layer of an infrared absorbing material disposed on said insulating layer and having a second particle size larger than said first particle size and a second smoke-like layer of a semiconducting material in intimate contact with said infrared absorbing layer.

8. The method of manufacturing a target structure for use in an infrared imaging device including the steps of forming an infrared transmissive window, cleaning said window of substantially all foreign material, evaporating a layer of insulating material on one surface of window, said insulating layer being evaporated in an inert gaseous atmosphere of a first pressure, evaporating an electrically continuously infrared absorbing material on the exposed surface of said insulating layer at a second pressure, and evaporating onto the exposed surface of said absorbing layer a thin semiconductor layer in an inert gaseous atmosphere at said first pressure.

9. An infrared responsive device comprising: conversion means to convert infrared radiation to thermal energy; thermally sensitive means to provide a response related to thermal energy applied thereto; and means to thermally insulate said thermally sensitive means from thermal energy other than from said conversion means comprising a low density smoke-like insulating layer.

References Cited in the file of this patent

UNITED STATES PATENTS

| | | |
|---|---|---|
| 2,288,766 | Wolff | July 7, 1942 |
| 2,319,195 | Morton | May 11, 1943 |
| 2,739,244 | Sheldon | Mar. 20, 1956 |
| 2,742,550 | Jenness | Apr. 17, 1956 |
| 2,804,561 | Sheldon | Aug. 27, 1957 |
| 2,816,954 | Huffman | Dec. 17, 1957 |
| 2,851,624 | Sheldon | Sept. 9, 1958 |
| 2,858,240 | Turner | Oct. 28, 1958 |
| 2,870,370 | Garbuny | Jan. 20, 1959 |
| 2,900,280 | Lubszynski | Aug. 18, 1959 |
| 2,906,637 | Auphan | Sept. 29, 1959 |
| 2,910,602 | Lubszynski | Oct. 27, 1959 |
| 2,938,141 | Garbuny | May 24, 1960 |